US005722047A

United States Patent [19]

Murayama

[11] Patent Number: 5,722,047

[45] Date of Patent: Feb. 24, 1998

[54] RECEIVER FOR RECEIVING MULTIPLEXED TEXT BROADCASTS

[75] Inventor: Shizue Murayama, Kanagawa, Japan

[73] Assignee: Sony Corporation, Tokyo, Japan

[21] Appl. No.: 650,775

[22] Filed: May 20, 1996

[30] Foreign Application Priority Data

Jun. 5, 1995 [JP] Japan .................................... 7-161431

[51] Int. Cl.[6] .................................................... H04B 1/16

[52] U.S. Cl. ........................................ 455/45; 455/186.1

[58] Field of Search ........................... 455/45, 66, 152.1, 455/158.1, 158.2, 158.3, 158.4, 158.5, 185.1, 186.1, 186.2, 345, 38.1, 38.4; 370/481, 482, 484; 395/507, 509; 348/468, 475, 563, 564

[56] References Cited

U.S. PATENT DOCUMENTS

| | | | |
|---|---|---|---|
| 5,063,610 | 11/1991 | Alwadish | 455/45 |
| 5,345,607 | 9/1994 | Liman et al. | 455/186.1 |
| 5,491,785 | 2/1996 | Robson et al. | 395/507 |
| 5,491,838 | 2/1996 | Takahisa et al. | 455/186.1 |
| 5,497,372 | 3/1996 | Nankoh et al. | 455/186.1 |

*Primary Examiner*—Reinhard J. Eisenzopf
*Assistant Examiner*—Thanh Le
*Attorney, Agent, or Firm*—Jay H. Maioli

[57] ABSTRACT

A receiver for receiving multiplexed text broadcasts includes a receiving circuit for receiving multiplexed text broadcasts that provide information including at least one program with at least one page formed with multiplexed data comprising a plurality of blocks each provided with a block identity code followed by a data packet, a memory for storing the multiplexed data received by the receiving circuit, a display device for displaying the information, a plurality of receive counters for receiving the block identity code and counting the block identity code for a predetermined number thereof for managing the display timing of the page of the program for being determined when the program is defined to display the page after a decided period of time from the reception of the multiplexed data, and a circuit for allotting the receiving counters by allotting the idle one of a plurality of the receiving counters for counting each of the block identity codes of the multiplexed data overlappingly received within the decided period of time for deciding the display timing of each of the pages.

2 Claims, 4 Drawing Sheets

RECEIVER FOR RECEIVING MULTIPLEXED TEXT BROADCASTS

BACKGROUND OF THE INVENTION

The present invention relates to a receiver for receiving multiplexed text broadcasts such as FM multiplexed text broadcasts.

With, for example, FM broadcasts in Japan, character information etc. is multiplexed as digital data and transmitted together with the original audio broadcast program as practical FM multiplexed text broadcasts. Meanwhile, FM receivers for receiving these broadcasts and displaying character information on a display device such as a liquid crystal display device are also being marketed.

Taking a DARC (DAta Radio Channel) method capable of receiving signals when mobile, the digital data multiplexing standard for character information etc. transmitted by a broadcasting station for these FM multiplexed text broadcasts is: a complementary wave carrier frequency of 76 kHz; a transmission rate of 16 kilobits per second; a modulation method of Level controlled Minimum Shift Keying (LMSK); and product coding using (272, 190) compact difference cyclic code adopted as the error correction method.

Program services such as character information etc. can be classified into levels 1, 2 and 3. In all three cases, character information is displayed using a dot display. In level 1 the information is provided as character information brought by a service adopting a receiver capable of displaying 15.5 characters×2.5 lines, including a header. In level 2, the information is provided as characters or figures brought on a service adopting a receiver capable of displaying 15.5 characters×8.5 lines, including a header. Level 3 is for traffic information services provided for receivers capable of displaying detailed maps from CD-ROM (Compact Disc Read-Only Memory) etc., namely navigation systems.

Level 1 program services can be considered to be used for news, weather forecasts, traffic information, entertainment and main completing programs etc. Entertainment is a service providing fortune telling, messages from listeners, quizzes, town information etc. A main completing program provides information for completing a program such as the song name, performers name and telephone and fax numbers for requests when the original audio broadcast program is, for example, a music program. The main completing programs are also referred to as program information or program linkage.

In addition to the above services, "emergency information" is also considered to be provided as the situation calls for at the time of emergencies.

FIG. 4 shows the multiplexed data frame structure in DARC method FM multiplexed text broadcasts. One frame of multiplexed data comprises 272 blocks, with each block comprising 288 bits.

The 272 blocks comprising one frame are divided into 190 data packet blocks and 82 vertical parity packet blocks, with the vertical parity packet blocks being distributed and transmitted.

A 16-bit BIC (Block Identity Code) is attached to the head of each block. Four kinds of BIC are used for distinguishing each of the parity packets and thus the heads of the frames can be discerned.

The data packet block has a 176-bit data packet following the BIC, after which a 14 bit CRC (Cyclic Redundancy Check) is added, followed by an 82 bit horizontal parity check code. The CRC code is attached for detecting errors remaining after product code error correction. Vertical parity packet blocks are provided to have 272-bit vertical parity packet following the BIC.

Each data packet comprises a 32-bit prefix followed by a 144-bit data block, as shown in FIG. 5.

This prefix comprises a service identity code, a decode identity flag, an information end flag, a renewal flag, a program number, a page number, a data link code and a data packet number, as shown in FIG. 6.

The service identity code consists of 4-bits and is for discerning the program contents etc. Regarding level 1, "1" is general information for successive reception processing, "2" is general information for recording reception-processing and "4" is for traffic information.

Successive reception processing is a mode for the receiver starting decode processing for displaying on receipt of the first data packet of the program data or the page data. Recording reception processing is a mode for not starting decode processing for displaying until all of the data for the program data or the page data are received and recorded and then error correction is carried out on every data group using CRC code.

Successive reception processing is carried out for a program where the information must be transmitted with preparation of suitable display timing on the receiving side or for a program where the information will not be displayed in time if the decode processing is started after the last packet of the data group is obtained.

The decode identity flag is of one bit, and is "1" when the error correction circuit for the receiver outputs data by decoding in the horizontal direction only, and "0" when the data is outputted after decoding in the horizontal direction and the vertical direction.

Successive reception processing when the decode identity flag is "0" is defined in such a manner that decode processing for displaying each of the data packets is carried out at the time when the receiver receives the BIC at the head of the 302nd packet (302nd block) from the receival of the BIC at the head of the first data packets.

The information end flag is of one bit and is "1" when transmission of a data group with a certain data group number is completed, and "0" when this is not the case.

The renewal flag is of two bits, and is incremented by one every time a data group is updated.

The program number is of 8 bits and the page number is of 6 bits, with the data group number being formed using both of these items.

The data link code is of 2 bits and is used for linking each group of the divided data group. When the capacity is so large that the number of the data packets belonging to one data group exceeds the maximum value of the data packet number, the data group is divided into a maximum of 4 groups with different data link codes. The data group is then transmitted with the divided groups of the same group number and different data link codes being linked in the order of the code numbers 0—1–2–3.

The data packet number is of 8 bits, and allotted in sequence from 0.

The program number is from 0 to 255, "main menu" being allotted to "0", mainly completing program (program information or program linkage) being allotted to "254" and emergency information being allotted to "255".

The page number is from 1 to 62, i.e. one program can have a maximum of 62 pages. One page corresponds to one or a plurality of data groups, with one data group comprising one or a plurality of data blocks.

At level 1, one page is usually displayed in the form of 15.5 characters×2.5 lines, but can also be displayed in the form of 15.5 characters×8.5 lines. Further, in this case, the character data is for displaying characters defined by JIS (Japanese Industrial Standard) code.

As described above, the receiver compatible with level 1 has, for example, an LCD (liquid crystal display device) 1 having a display screen 1*a* capable of displaying 15.5 characters×2.5 lines. The 15.5 character by 2 line-portion 1*b* below a dotted line of the display screen 1*a* is for displaying text and the 0.5 line portion 1*c* above the dotted line is a header text display region.

The receiver receives a stereo composite signal and an LMSK signal, and decodes the character data from this LMSK signal to write the data to a buffer memory.

A "main menu" button is provided at the receiver or at a remote control unit for remotely controlling the receiver and the receiver then displays the main menu at the display screen 1*a* as a result of this button being pressed, as shown in FIG. 8A. FIG. 8A shows characters "1. PROGRAM INFORMATION" and "2. NEWS AND SPORTS" displayed using JIS code as the first page of the main menu extending over a plurality of pages or the first two lines of a page of a text in an 8.5 lines display format.

The receiver or remote control transmitter is further provided with a "image paging" button. By operating this button, "3. WEATHER FORECAST" and "4. TRAFFIC INFORMATION" of the next page or the next two lines of text of a page in the 8.5 line display format are displayed using JIS code at the display screen 1*a* as shown in FIG. 8B.

When the user decides upon the number of an item which the user wishes to see from within the main menu, depending on the case, then the contents of this selected item are displayed. For example, if the user selects "3. WEATHER FORECAST" from within the main menu, then the contents "1. TODAY'S WEATHER 2. TOMORROW'S WEATHER" are displayed using JIS code, as shown in FIG. 9.

Further, when the user decides upon the number of an item that the user wishes to see from within the contents, then the first page of the selected item is shown. For example, when the user selects "1. TODAY'S WEATHER" from the contents, specific character information relating to a prescribed region such as, for example, the weather forecast for Tokyo, is displayed as "TODAY'S WEATHER", as shown in FIG. 10.

Programs for the successive reception processing with the decode identity flag "0" for FM multiplex text broadcasts are defined in such a manner that, as mentioned previously, the receiver displays information regarding each of the data packets on the screen of the display device at the time when the receiver receives the BIC at the head of the 302nd data packet from the former.

The receiver is then constructed in such a manner as to manage the display timing of pages, when data packets for the pages of programs for the successive reception processing with the decode identity flag "0" are received, by counting BICs of data packets subsequent to the received data packets using the counter.

However, in this case, when data packets of a certain page of a program for the successive reception processing with the decode identity flag "0" have been received and data packets for a separate page of a program of the successive reception processing with the same decode identity flag "0" are received while the display timing of the former page is being counted, it becomes necessary to count and manage the display timing of the separate page so as not to influence the display timing of the former page for which the display timing is currently being counted.

Further, there is a large possibility that several pages or several packets of data packets for pages of programs for the successive reception processing with the decode identity flag "0" are transmitted overlappingly within the time that the above 302 packets are being received, although this depends on how the programs for the successive reception processing with the decode identity flag "0" are transmitted from the broadcasting station.

It is therefore an object of the present invention to provide a receiver for receiving multiplexed text broadcasts such as FM multiplexed text broadcasts which, when data packets of the multiplexed data for pages of programs defined to display information at a time after a decided period of time from the time of receival of the data packets are overlappingly received within the decided period, is capable of managing the display timing of each of the pages so that the display timing is independently decided without influencing the display timing of the other pages.

SUMMARY OF THE INVENTION

According to the present invention, a receiver comprises a receiving circuit, a memory, a display device, a plurality of receive counters and means for allotting receiving counters. The receiving circuit is for receiving multiplexed text broadcasts that provide information including at least one program with at least one page formed with multiplexed data comprising a plurality of blocks each provided with a block identity code followed by a data packet. The memory is for storing the multiplexed data received by the receiving circuit. The display device is for displaying the information. A plurality of the receive counters are for receiving the block identity code and counting the block identity code for a predetermined number thereof for managing display timing of the page of the program for being determined when the program is defined to display the page after a decided period of time from the reception of the multiplexed data. The means for allotting receiving counters allots the idle one of a plurality of the receiving counters for counting each of the block identity codes of multiplexed data overlappingly received within the decided period of time for deciding the display timing of each of the pages.

According to the present invention, the means for allotting receiving counters suspends counts for the preceding pages in a sequence from a first-allotted receive counter when data packets for new pages are overlappingly received while all of the receive counters are allotted for counting, and newly allots the suspended receive counters in a sequence from the first-allotted receiving counter for counting for new pages for deciding the display timings of the new pages.

With the receiver of this invention constructed in the above way, when a data packet of a certain page J is received for a program for the successive reception processing with the decode identity "0", one idle receive counter A of a plurality of receive counters is allotted to this page J. The BIC is then counted by this receive counter A and the display timing of the page J is managed for being decided.

If a data packet for a separate page K of a program for the successive reception processing with the same decode identity "0" is then received within the time from the first reception of the data packet for this page J to the reception of the 302nd packet, the count for the display timing for the page J is then continued by the receive counter A. The count for the display timing of the new page K is then allotted to one idle receive counter B rather than the receive counter A which is currently counting the display timing for the page J. BIC is then counted by this receive counter B and the display timing for this page K is managed for being decided.

Further, if a data packet for a further separate page L for a program for the successive reception processing without the same decode identity flag "0" is then received within the time from the first reception of the data packet for this page J to the reception of the 302nd packet, the counts for the display timing for the pages J and K are then continued by the receive counters A and B. The count for the display timing of the new page L is then allotted to one idle receive counter C rather than the receive counters A and B which are currently counting the display timing for the pages J and K. BIC is then counted by the receive counter C and the display timing for this page L is managed for being decided.

The display timing for each of pages can therefore be managed for being decided independently without influencing the display timing of other pages.

DETAILED DESCRIPTION OF THE PREFERRED EMBODIMENT

Embodiment

Figure 1:
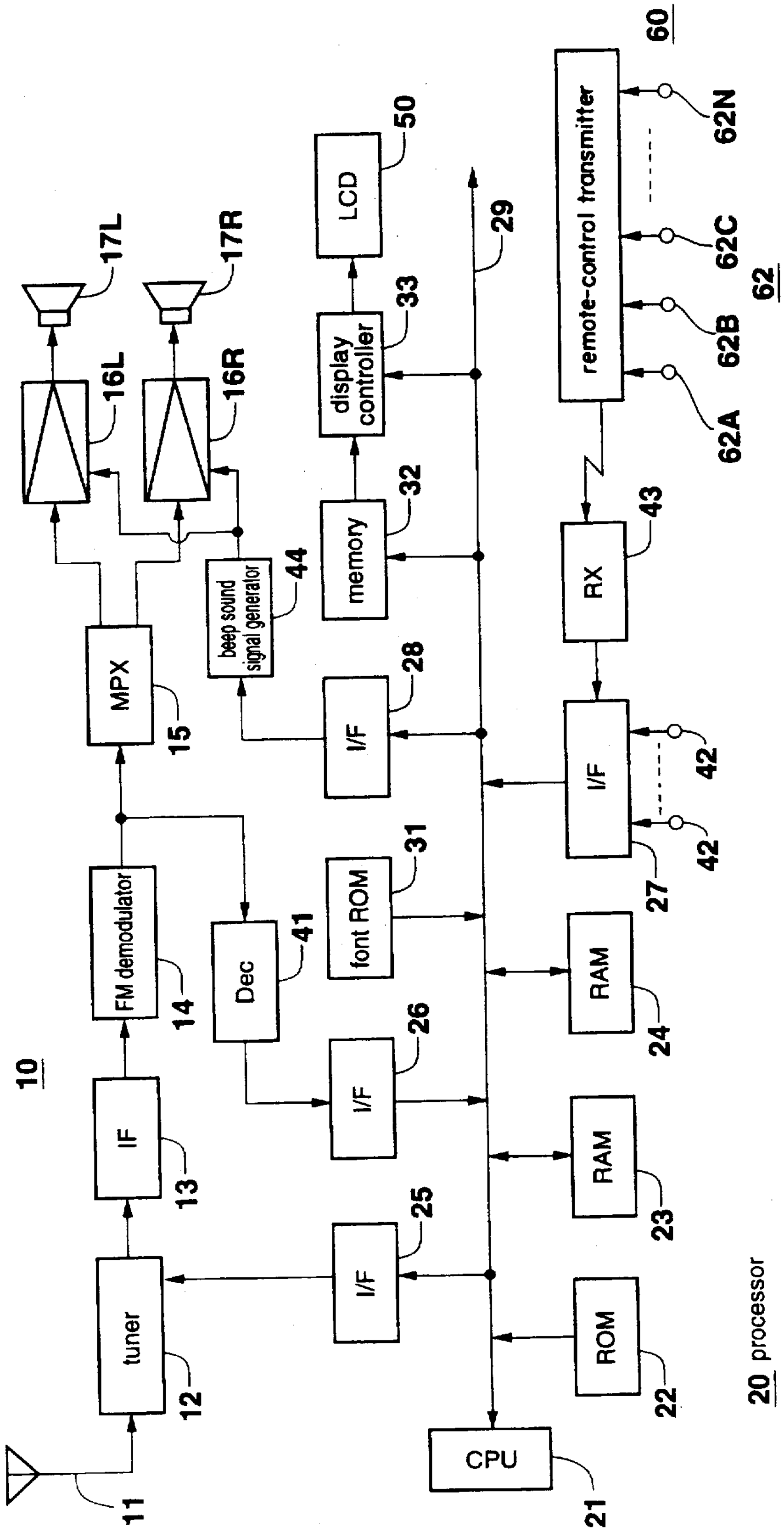
FIG. 1 is a view showing an embodiment of the receiver of this invention.

FIG. 1 shows the case of a level 1-compatible on-vehicle FM receiver for receiving FM teletext broadcasts as an embodiment of the invention.

In the FM receiver 10 of this embodiment, an FM signal received by the antenna 11 is provided to a synthesizer tuner 12 and the broadcasting station of the target frequency is selected. This FM signal is converted to an intermediate frequency signal, with this intermediate frequency signal being provided to an FM demodulator 14 via an intermediate frequency amplifier 13.

A frequency multiplexed signal of a DSB signal balance-modulated with a sum signal (L+R) and a difference signal (L−R) of the left and right channels of a stereo audio signal L and R, a pilot signal and the aforementioned LMSK signal in the FM multiplexed text broadcast is then extracted from the FM demodulator 14.

This frequency-multiplexed signal is then provided to a stereo demodulator 15 where left and right channel audio signals L and R are demodulated from the sum signal (L+R) and the DSB signal. These audio signals L and R are then provided to left and right channel speakers 17L and 17R via amplifiers 16L and 16R.

Further, a processor 20 is provided at the FM receiver 10 for carrying out the station selection at the tuner 12 and the displaying of characters of the FM multiplexed text broadcast.

This processor 20 comprises a CPU 21 for executing programs, a ROM 22, a RAM 23 used as a work area and a RAM 24 for use as a buffer for receiving the FM multiplexed text broadcast data. Each of the routines are written in the ROM 22.

The ROM 22 and the RAMs 23 and 24 are connected to the CPU 21 via the system bus 29, with interfaces (ports) 25 to 28 also being connected to this system bus 29.

Data for station selection is provided to the tuner 12 from the interface 25 and this station selection is carried out. Moreover, a demodulation signal from the FM demodulator 14 is provided to the decoder 41 and data in the FM multiplexed text broadcast is decoded and extracted from the LMSK signal. This data is then written to the RAM 24 via the interface 26. The data for the RAM 24 is always updated with the newest data.

Further, each of the various operation buttons 42 constructed using non-lock-type push switches are connected to the interface 27 and these button outputs are taken-in at the microcomputer 20. In this way, if an arbitrary button of the operation buttons 42 is pressed, this pressed button is discerned by the CPU 21 and a process corresponding to the pressed button is carried out.

In the case of FM receivers 10 for on-vehicle use, the operation panel is narrow and therefore cannot be provided with a large number of operation buttons. Therefore, in this example, operation buttons are provided only for highly frequent and highly important operations, with other operations being carried out with a remote control unit (remote operator).

Because of this, a receiver 43 for the remote control unit is connected to the interface 27. The remote control unit in this example uses an infra-red light method, with the receiver 43 having a light receiving device for receiving an infra-red light from a remote control transmitter 60 and a decode circuit for decoding remote control signals from this light-receiving device.

Further, various operating buttons 62 (62A to 62N) constructed using non-lock type push switches are provided at the remote control transmitter 60. The functions of some of these operating buttons overlap with the functions of the operation buttons 42. However, if arbitrary buttons of the operating buttons 62 are pressed, data corresponding to the pressed button is generated, converted to infra-red light and transmitted to the FM receiver 10.

Then, at the FM receiver 10, infra-red light transmitted from the remote control transmitter 60 is received by the receiver 43, the original data is extracted, and this data is provided to the interface 27. In this way, when these operating buttons 62 are pressed, processes corresponding to the pressed buttons are executed by the microcomputer 20 in the same way as in the case for the operation buttons 42.

A beep sound signal generator 44 is connected to the interface 28 and beep sound signals from this beep sound signal generator 44 are provided to the amplifiers 16L and 16R.

Further, a font ROM (character generator) 31 having font data for converting character data transmitted in the FM multiplexed text broadcasts into display data is connected to the system bus 29. A memory 32 for display use and a display controller 33 are also connected to the system bus 29, with, for example, an LCD 50 being connected to the display controller 33 as a display device.

Figure 7:
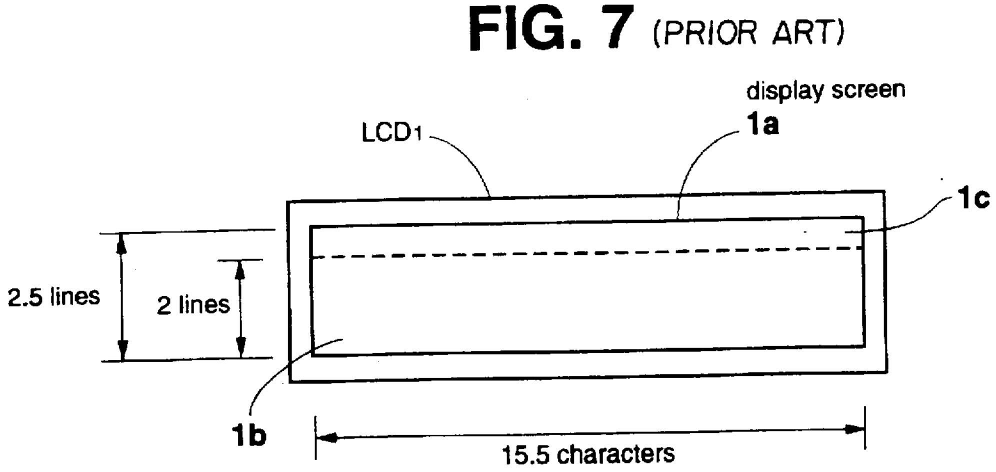
FIG. 7 (PRIOR ART)
FIG. 7 is a view showing a display device provided in a receiver compatible with level 1 FM teletext broadcasts.
Figure 8A:
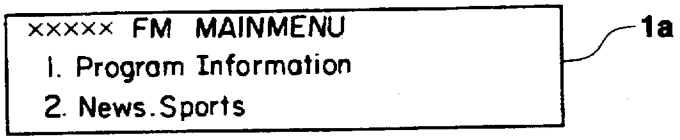
FIG. 8A (PRIOR ART)
FIG. 8A and FIG. 8B are views each showing an example of a display for the display screen of the display device.
Figure 8B:
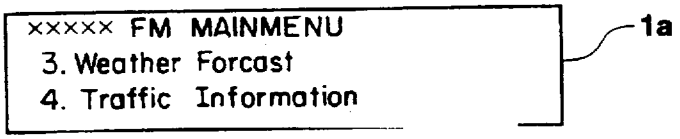
FIG. 8B (PRIOR ART)
Figure 9:
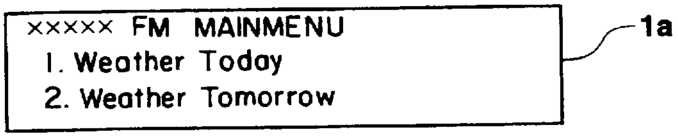
FIG. 9 (PRIOR ART)
FIG. 9 is a view showing an example of a display for the display screen.
Figure 10:
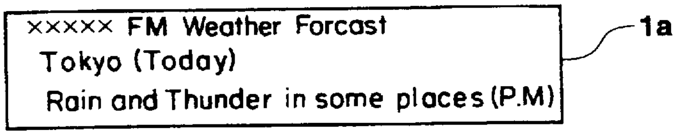
FIG. 10 (PRIOR ART)
FIG. 10 is a view showing an example of a display with information related to a prescribed region for the display screen.

The LCD 50 has a display screen capable of displaying 15.5 characters by 2.5 lines in the same way as for the aforementioned LCD 1 shown in FIG. 7. The lower side 15.5 character×2 line portion 1*b* of the screen is taken as a text display region and the upper side 0.5 line portion 1*c* is taken as a header sentence display region.

The memory 32 for display use adopts a bit map method compatible with the display method of this LCD 50 and has the capacity for one picture.

The character code held in the RAM 24 is read-out by a CPU 21. The read out character code is converted to display data using the font data of the font ROM 31 and this display data is written to the memory 32. Further, at this time, the display data of the memory 32 is repeatedly read-out by the display controller 33, converted to a display signal and provided to the LCD 50. Characters for the character code read-out from the RAM 24 by the CPU 21 are then displayed at the display screen of the LCD 50.

Figure 2:
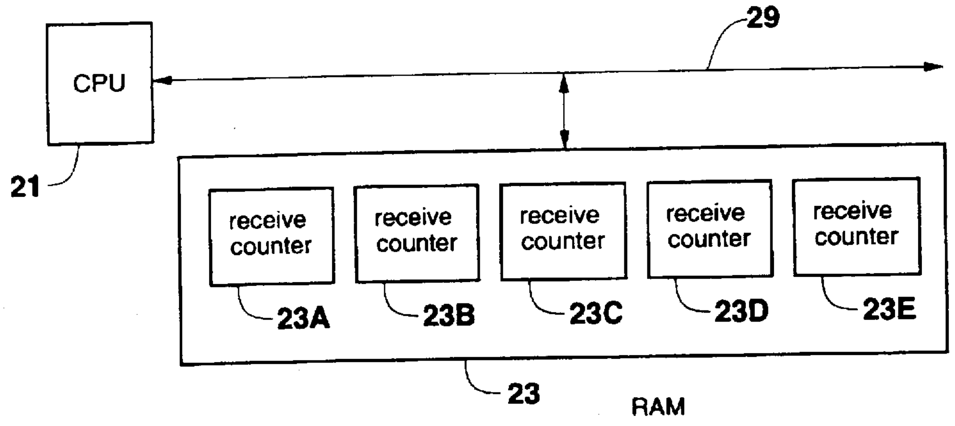
FIG. 2 is a view showing an example of the essential parts of the structure of the embodiment.

Five receive counters 23A to 23E are provided at the RAM 23 as BIC receive counters for managing the display timing of programs for the successive reception with the decode identity flag "0" occurring in the FM multiplexed text broadcast data, as shown, for example, in FIG. 2.

The CPU 21 then allots idle receive counters of the five receive counters 23A to 23E to the respective pages when data packets for pages of programs for the successive reception processing with the decode identity flag "0" are overlappingly received within the aforementioned time for receiving 302 packets. The BICs are then counted by the allotted receive counters and the page display timing is decided.

Figure 3:
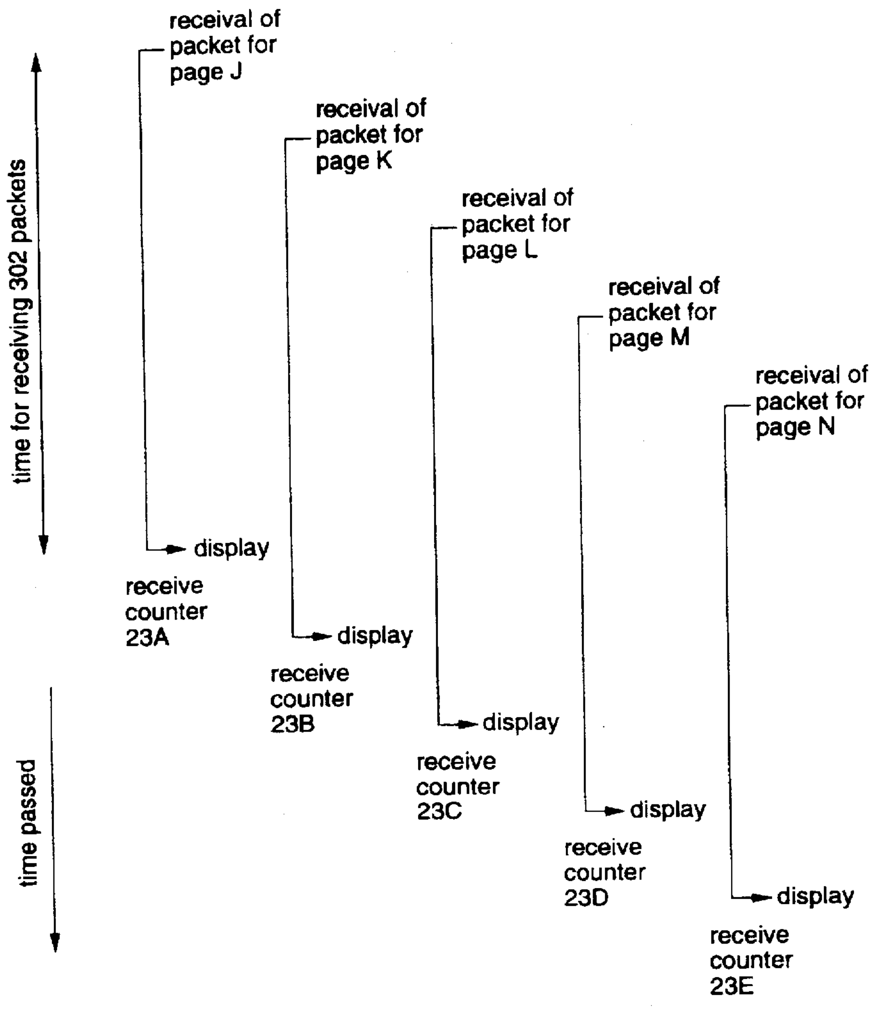
FIG. 3 is a view describing the operation of the receiver of the invention.
Figure 4:
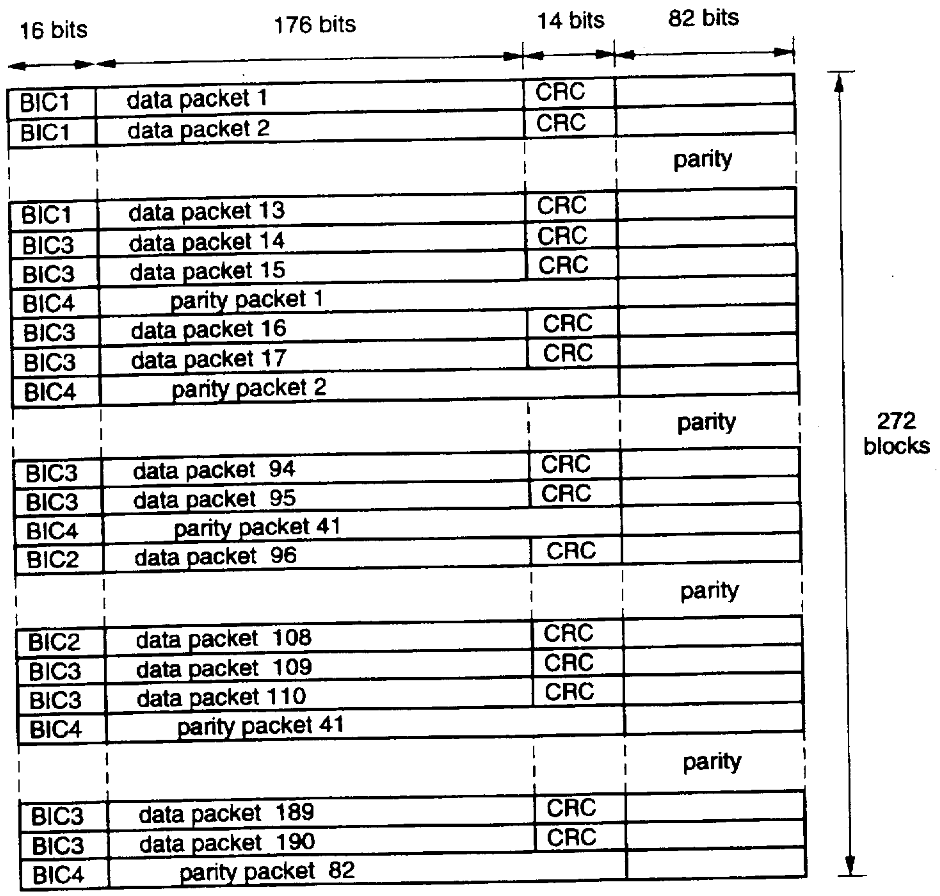
FIG. 4 (PRIOR ART)
FIG. 4 is a view showing the data frame structure of an FM multiplexed text broadcast.
Figure 5:
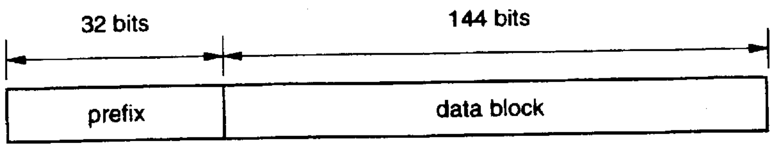
FIG. 5 (PRIOR ART)
FIG. 5 is a view showing the structure of the data packet.
Figure 6:
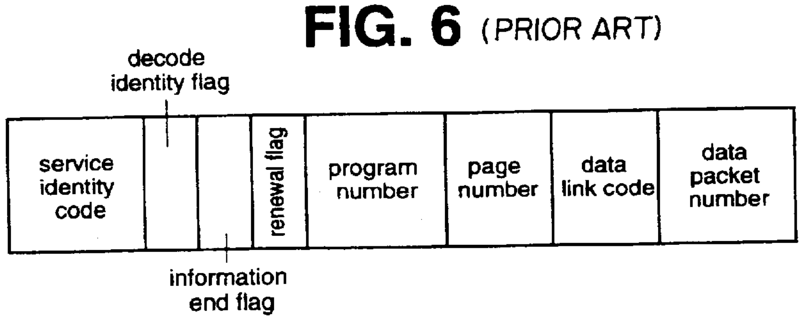
FIG. 6 (PRIOR ART)
FIG. 6 is a view showing the structure of the prefix.

Namely, as shown in FIG. 3, when a data packet for a certain page J of a program for the successive reception processing with the decode identity flag "0" is received, the CPU 21 searches for an idle receive counter from amongst the receive counters 23A to 23E and allots one of the receive counters 23A to the page J. After this, the receive counter 23A is decremented every time a BIC is received. The page J is then displayed on the display screen of the LCD 50 at the time when the BIC for the 302nd packet is received from the time the data packets of the page J are first received on the basis of the value of the receive counter 23A.

If a data packet for a separate page K of a program for the successive reception processing with the same decode identity flag "0" is received while the BIC is counted by the receive counter 23A assigned to the page J, i.e. during the time from the first reception of the data packets for the page J to the reception of the 302nd packet, the CPU 21 lets the receive counter 23A continue counting of the BIC for page J. The CPU 21 then searches for an idle counter amongst the receive counters 23A to 23E and allots one receive counter 23B to the page K. After this, the receive counter 23B is decremented every time a BIC is received and the page K is displayed on the display screen of the LCD 50 at the time when the BIC for the 302nd packet is received from the receival of the data packet for the page K on the basis of the value of this receive counter 23B.

If data packets for a further separate page L of a program for the successive reception processing with the same decode identity flag "0" are received while the receive counters 23A and 23B are respectively counting BICs assigned to the pages J and K, i.e. during the time from the first reception of the data packets for the page J to the reception of the 302nd packet, the CPU 21 continues counting of the BICs for pages J and K using the receive counters 23A and 23B. The CPU 21 then searches for an idle counter amongst the receive counters 23A to 23E and allots one receive counter 23C thereof to the page L. After this, the receive counter 23C is decremented every time a BIC is received and the page L is displayed on the display screen of the LCD 50 at the time of the receival of the BIC for the 302nd packet after the receival of the data packet for the page L on the basis of the value of this receive counter 23C.

If data packets for further pages M and N for the programs for the successive reception with the same decode identity flag "0" are received during the time from the first reception of the data packets for the page J to the reception of the 302nd packet thereof, idle receive counters 23D and 23E are allotted to the pages M and N respectively. The pages M and N are then respectively displayed on the display screen of the LCD 50 at the time when the respective BICs for the 302nd packets for pages M and N are received, following after the receival of the respective first data packets for these pages.

The time interval between sending data packets for pages programs for the successive reception processing with the decode identity flag "0" is transmission side-dependent. However, if the five receive counters 23A to 23E are provided as shown in the example in the drawings, the display timing for the respective page can be practically managed for being determined independently of the respective pages without exerting any influence on the display timing of other pages.

In this example, if data packets for a further separate page of a program for the successive reception processing with the decode identity flag "0" is received while all five receive counters 23A to 23E are counting BICs, the CPU 21 discontinues the BIC count for the page that came first and allots the new page to the receive counter that was allotted to the page that came first so as to then manage and decide the display timing for this new page using this receive counter.

In the above way, according to the present invention, at a receiver for receiving multiplexed text broadcasts such as FM multiplexed text broadcasts, when data packets for pages of programs which are defined to display information at a time after a decided period from the time of receival of the data packets are overlappingly received within this decided period, the display timing of each of the pages is managed to be decided independently without influencing the display timing of other pages.

What is claimed is:

1. A receiver for receiving multiplexed text broadcasts, comprising:
   - a receiving circuit for receiving a plurality of multiplexed text broadcasts;
   - said plurality of multiplexed text broadcasts providing information including at least a first program with a plurality of pages formed with a plurality of multiplexed data having a plurality of blocks, each one of said plurality of blocks being provided with a block identity code followed by a data packet;
   - a memory for storing said plurality of multiplexed data received by said receiving circuit;
   - a display device for displaying said information;

a plurality of receiving counters for receiving said block identity code and counting a predetermined number thereof for managing a display timing of a first page of said first program when it is determined that said first program is defined to display said first page after a predetermined period of time from the reception of said plurality of multiplexed data having a plurality of blocks; and means for allotting said plurality of receiving counters, wherein said means for allotting allots an idle one of said plurality of receiving counters for counting each of said block identity codes provided with each of said plurality of blocks of said plurality of multiplexed data overlappingly received with said predetermined period of time for deciding said display timing of each of said plurality of pages.

2. The receiver for receiving multiplexed text broadcasts according to claim 1, wherein said means for allotting said plurality of receiving counters suspends counting of said block identity codes for a plurality of preceding pages in a sequence from a first-allotted receiving counter when a plurality of data packets for a plurality of new pages are overlappingly received while all of said receive counters are allotted for counting said block identity codes for said plurality of preceding pages, and newly allots said suspended receive counters in a sequence from said first-allotted receiving counter for counting said block identity codes for said new pages for deciding the display timings of said plurality of new pages.

* * * * *